Aug. 12, 1947.   E. E. COMBS   2,425,304
SPHERICAL COIL FOR VARIOMETERS
Original Filed Sept. 6, 1944
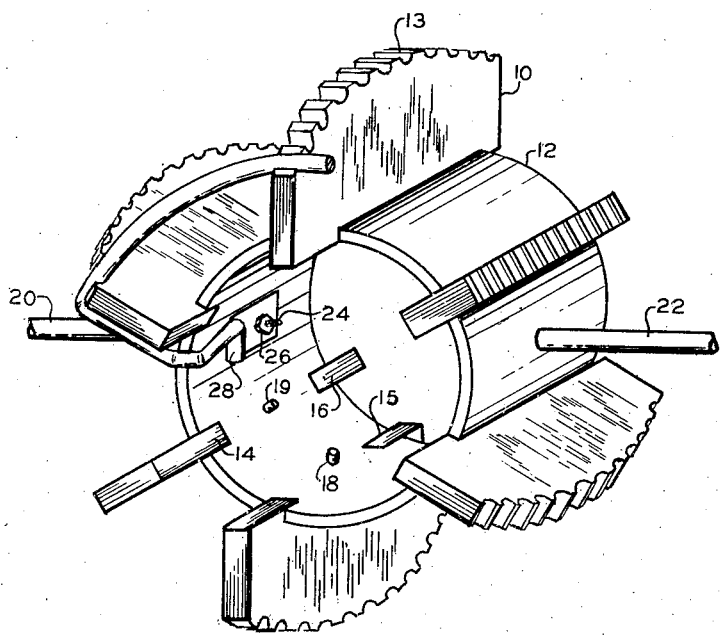
INVENTOR.
EDWARD E. COMBS
BY
*William D. Hall*
Attorney Patented Aug. 12, 1947

2,425,304

UNITED STATES PATENT OFFICE 2,425,304

SPHERICAL COIL FOR VARIOMETERS

Edward E. Combs, Long Branch, N. J.

Original application September 6, 1944, Serial No. 552,859. Divided and this application October 4, 1945, Serial No. 620,375

4 Claims. (Cl. 242—9)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to spherical coils used in radio tuning circuits. The invention discloses the structural features of the spherical coils, the method of winding such coils having been disclosed in a parent application 552,859, filed September 6, 1944, titled "Spherical coils for variometer," this application being a division of the parent application.

It is very well known in the radio art that the spherical coils when used in connection with variometers are much more effective than the cylindrical coils because the spherical coil rotor may be coupled much closer to the cylindrical stator of the variometer thus enabling one to span much wider frequency band with the variometers of this type, the combination being capable of replacing as many as six fixed R. F. coils. Although the advantages of the spherical coils are well known in the art, their use has been somewhat limited because no simple manufacturing methods were available, and, as a consequence, the majority of variometers used cylindrical rotors.

The invention discloses structural features of the spherical radio coils which support the wire, the latter having been given a spherical form during the winding operation of the coil. The winding methods and jigs for the coils of this type are disclosed in the parent application, and this application discloses the structural features of the coils produced according to the previously disclosed winding methods.

It is therefore an object of this invention to provide spherical radio coils having improved structural and electrical features.

These and other features of the invention will be more clearly understood from the following detailed description and the accompanying drawing in which the only figure discloses a perspective view of the coil form.

It is known in the radio art that uses of the variometer are encountered which subject the coils to such heavy loads that the current-carrying wire reaches sufficiently high temperature either to melt or carbonize the wire supporting elements made of plastics. The use of plastics for making the wire supporting elements is always desirable because of their resistances to shock. However, when the radio coils are heated to such high temperatures, the use of the plastics for supporting the wire is impossible and materials which can withstand high temperatures, such as ceramic materials, must be used in their stead. In the prior art it has been known to use ceramic bridges for supporting the wire; however, the coils with the ceramic bridges invariably used ceramic disks or ceramic rings for supporting them which rendered the entire coil frame very brittle and not capable of resisting severe mechanical shocks. The invention discloses a coil frame in which the bridges are made of ceramic material while the ring supporting the bridges is made of plastics, the resilient properties of the plastics making the coil frame more suitable for resisting very severe mechanical shocks.

Referring to the drawing, the wire supporting bridges 10 are made of ceramic material, the bridges being mounted on a ring 12 made of plastic. The outer surfaces 13 of the bridges are grooved for holding the wire and the inner ends of the same bridges are provided with extensions 14 and 16 which fit into recesses 15 provided for this purpose in ring 12. In order to stiffen the structure still further the ceramic bridges and the ring may be provided with suitable holes 18 which are used for mounting pins 19 made of plastic which act as additional elastic means for holding the ceramic bridges in an elastic engagement with the ring. A two-piece shaft 20 and 22 of the coil is mounted on ring 12 by means of threaded ends 24 and nuts 26 (only one end is visible in the figure). The wound wire is connected to the shaft by means of lugs 28.

The advantage of the structure illustrated in the figure resides in the fact ring 12 is made of plastic thus providing a resilient support for the ceramic pieces, the resiliency of the ring and the resiliency of the connections between the ring and the bridges contributing markedly to the ability of the coil to absorb severe mechanical shocks. In the prior art ring 12 is made of ceramic materials which produce a very brittle frame not capable of absorbing severe mechanical shocks. The mechanical shocks are transferred to the surfaces interconnecting the bridges with the ring which produces cracking of the joints. This is not the case in the disclosed structure because the ring acts as a shock-absorbing medium. When the shocks are transmitted through the shaft pieces 20 and 22 to the ring the shock is absorbed to a very large extent by the ring and is transferred to the bridges in a sufficiently subdued form so as to prevent cracking of the ceramic pieces at the joints. When the ring is made of the ceramic material it ordinarily cracks resulting in the collapse of the entire coil.

The methods for winding the spherical coil frames of the type disclosed in this specification are disclosed in the previously mentioned parent application and in the co-pending application of N. T. Volsk, S. N. 561,800, filed November 3, 1944, titled "Jig for winding spherical coils," now Patent No. 2,394,023.

While the invention has been described with reference to a particular embodiment, it will be understood that various modifications of the apparatus shown may be made within the scope of the following claims.

I claim:

1. A frame for a spherical radio coil including a ring made of plastic material, a plurality of ceramic bridges symmetrically and radially disposed around, and fastened to, said ring, the outer ridge surfaces of each bridge forming spaced wire supports for said coil, and a two-piece coil shaft fastened to said ring.

2. A frame for a spherical radio coil as defined in claim 1 which further includes extensions at the inner ends of said bridges, and recesses on both sides of said ring, said extensions fitting into said recesses.

3. A frame for a spherical radio coil including a ring made of plastic, a plurality of pairs of aligned rectangular recesses along the two edges of said ring, a plurality of ceramic bridges radially disposed around and resting on said ring, two rectangular extensions at the inner end of each of said bridges, said extensions fitting into the corresponding recesses on said ring, and a two-piece metallic shaft connected to said ring for rotatively supporting said coil and for electrically connecting said coil to outside circuits.

4. A frame as defined in claim 3 which further includes pins made of plastic interconnecting said bridges and said ring.

EDWARD E. COMBS.